Aug. 16, 1938.                A. LANGSNER                2,127,302
                                 LEVEL
                            Filed Nov. 2, 1934
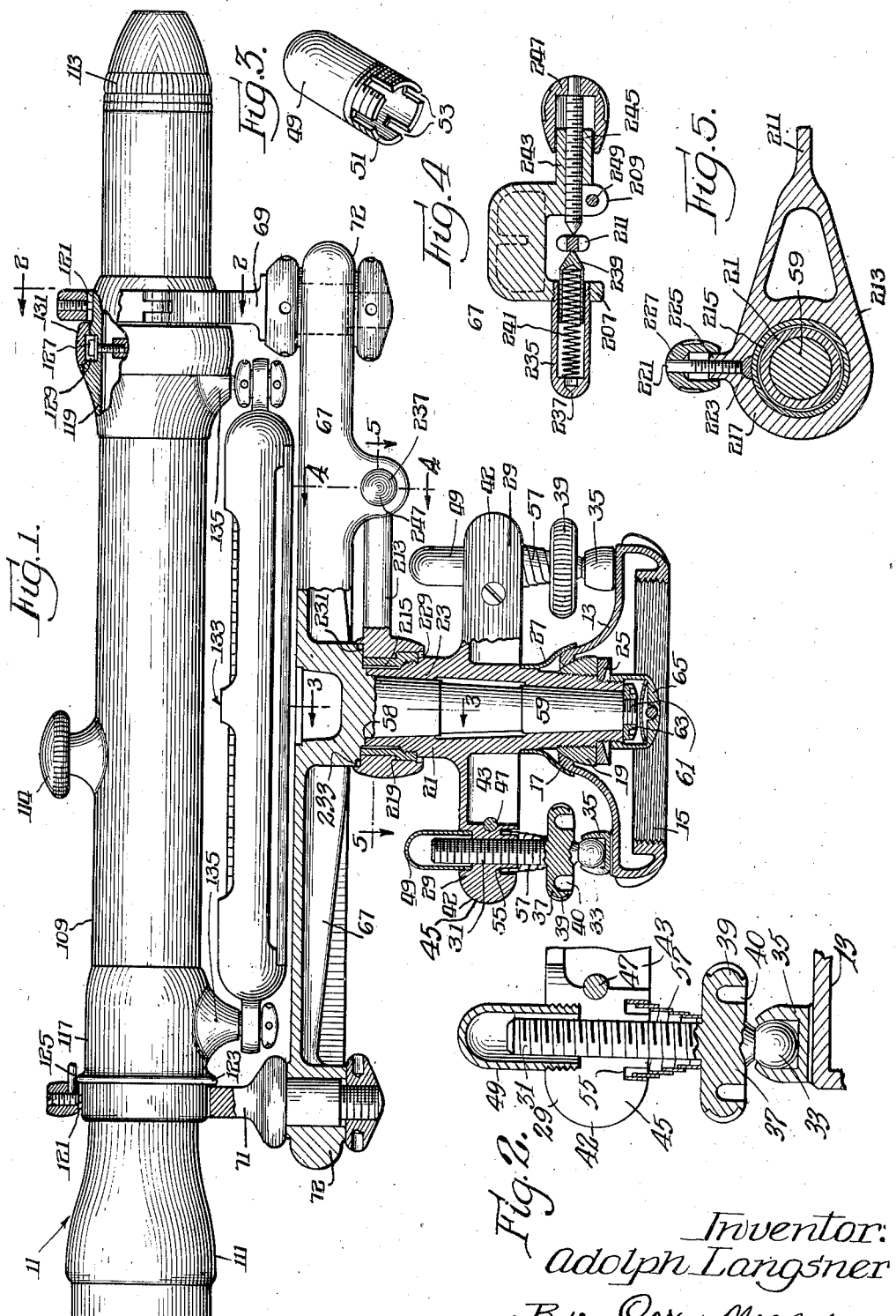
Inventor:
Adolph Langsner
By:- Cox + Moore atty Patented Aug. 16, 1938

2,127,302

UNITED STATES PATENT OFFICE 2,127,302

LEVEL

Adolph Langsner, Chicago, Ill., assignor to Eugene Dietzgen Company, Chicago, Ill., a corporation of Delaware Application November 2, 1934, Serial No. 751,240

2 Claims. (Cl. 248—181)

My invention relates in general to measuring instruments and has more particular reference to levels and similar precision devices for use in surveying.

An important object of the invention is to provide a device of the class described designed to exclude dirt and other foreign matter while affording a pleasing appearance in the instrument.

Another important object is to provide an adjustable support, for a sighting device such as a telescope, having means to exclude foreign matter from the adjusting mechanism.

Another object is to provide an adjustable support, for a sighting device such as a telescope, comprising angularly movable members and threaded means for adjusting the relative angularity of the members including cover means at all times enclosing and concealing the threaded means; a further object being to utilize an expansible sheet metal tube as a cover.

Another important object is to provide a leveling support, for an instrument such as a telescope, wherein the support comprises a leveling screw plate and a part swiveled on said plate and affording a spider having split arms carrying leveling screws in position to co-operate with the screw plate in order to adjust the relative position of the parts, said split arms carrying resilient sheet metal dust covers for enclosing said leveling screws, so constructed that the covers can be held in place when expanding or contracting the split arms.

Numerous other objects, advantages, and inherent functions of the invention will become apparent as the same is more fully understood from the following description, which, taken in connection with the accompanying drawing, discloses a preferred embodiment of the invention.

Referring to the drawing:

Fig. 1 is a vertical section taken longitudinally through a Y level embodying my present invention;

Fig. 2 is an enlarged section taken substantially along the line 2—2 in Fig. 1;

Fig. 3 is an enlarged perspective view of a part of the assembly shown in Fig. 1; and Figs. 4 and 5 are sectional views taken substantially along the lines 4—4 and 5—5, respectively, in Fig. 1.

To illustrate my invention, I have shown on the drawing, a precision measuring instrument adapted for use in surveying, and, although the particular instrument shown comprises a so-called Y level, it will be obvious that the invention is not necessarily restricted to a Y level since the illustrated instrument is shown merely for the purpose of demonstrating the invention.

The measuring instrument shown comprises a telescope 11 and adjustable support means for carrying the telescope in operative position, said support means providing for accurately adjusting the longitudinal axis of the telescope to a true horizontal position and for positioning the telescope accurately to a desired angular position in a horizontal plane through the axis of the telescope. To this end, the support comprises a plate-like element 13, forming a leveling screw plate formed with preferably threaded means 15 for securing the plate on a support such as a surveyor's tripod (not shown).

The plate 13 is formed centrally with an upwardly projecting annular portion providing a ball socket 17 adapted to receive a ball portion 19 carried by a frame element 21 forming a tapered spindle journal 23. The ball portion 19 may comprise a collar threaded on the lower end of the frame 21 and secured in place by means of a lock nut 25.

The ball portion 19 extends within and is enclosed within the annular seat-forming portion of the plate 13, while the element 21 extends upwardly of said annular portion and carries an annular dust cover 27 forming a skirt lying on the outer surfaces of the annular seat-forming portion in order to prevent access of foreign material to the ball and its seat. This dust proof skirt 27 conceals the joint and improves the appearance of the instrument while imparting a streamline appearance and reducing wind resistance of the parts forming the ball and socket connection. Above the skirt 27, the element 21 has radially extending arms 29 into which leveling screws 31 are threaded.

The leveling screws 31 project above and below the arms 29 and are formed at their lower ends with balls 33 seated in sockets 35 formed on or in the plate near its periphery.

The sockets 35 preferably comprise cup-like elements having their bottoms secured to the plate 13 and peened at their upper edges around the balls 33. The leveling screws are preferably formed with substantially disk-like portions 37, the peripheral edges of which are rounded to reduce wind resistance, and knurled as at 39 in order to facilitate manual turning of the leveling screws. The under side of the disks 37 may be provided with an annular groove 41 in order to lighten the same.

The arms 29 may likewise be formed with an annular groove 43 in their under surface in order to lighten the same and their lateral surfaces are curved as shown at 42 to reduce wind resistance and improve appearance. The arms also are preferably provided each with a slot 45 extending therein diametrally with respect to the threaded openings in which the leveling screws extend. Each arm also carries a clamping means, preferably a screw 47, for clamping the arm parts on opposite sides of the slot 45 upon the leveling screws in order to secure the same in adjusted position. In order to enclose and conceal the threaded portions of the leveling screws which project above the arms 29, I provide dust caps 49 shown in detail in Figure 7, said caps comprising preferably cylindrical shells of spun sheet metal, which are closed with a rounded configuration at one end, to reduce wind resistance and improve appearance, and are threaded at their opposite open ends to engage in enlarged sockets formed in the upper surfaces of the arms 29 at the opening through which the upper ends of the leveling screws extend. The covers 49 are provided with longitudinal slots 53 at spaced positions in the open end thereof, so that the resilience of the cover may be utilized to hold the same snugly in place no matter how tightly the clamping screws 47 are set.

Annular sockets 55 are also formed in the arms 29 in position encircling the opening through which the leveling screws extend downwardly of the arms 29, and expansible sheet metal covers 57 preferably comprising each a spirally wound strip providing an expansible tubular element is arranged about each leveling screw to enclose the same. These expansible covers seat at one end in the seats 55 and bear at their other ends against the upper surface of the screw-adjusting disks 37, thus enclosing the threaded portions of the screws below the arms 29.

The frame 21 provides a base for rotatably carrying the sighting device or telescope 11. To this end the tapered bearing 23, which is formed in the frame 21, carries a spindle means and associated clamping and adjusting means whereby the telescope may be rotatably mounted in the frame and adjusted in a desired angular position with respect to the frame. The telescope carrying spindle means comprises a frame 67 formed with a spindle or shaft 59 which is journalled for rotation in the bearing 23 about a substantially vertical axis. The bearing 23 and spindle 59 taper downwardly so that the spindle may be inserted in the bearing from the upper end thereof. The lower end of the spindle has a threaded portion 61 projecting from the lower end of the bearing and carrying a holding nut 63 adapted to prevent the upperward removal of the spindle after the same has been assembled. The upper ends of the bearing and spindle may form a thrust bearing at 58 and the lower end of the bearing element 21 carries a cover cap 65 to enclose the projecting lower end of the spindle and prevent dust and other foreign matter from entering the bearing at the lower end.

The upper end of the spindle 59 projects upwardly of the upper end of the bearing 23 and carries the telescope support frame 67 above the bearing. The support frame 67 and spindle 59 may be formed separately and secured together in any desired fashion, although I prefer to form these parts integrally as shown. The frame 67 carries telescope supports 69 and 71 in which the telescope 11 is cradled, and the sides of the frame are curved as at 72 to improve appearance and reduce wind resistance.

The telescope supports may be of any suitable or preferred form but I have shown so-called Y level supports adapted to removably receive the telescope in order to permit the same to be reversed on the supports.

The telescope 11 may be of any suitable or preferred form and preferably comprises a tubular barrel 109 formed with a preferably belled end 111 containing an objective assembly, the opposite or occular end of the telescope being preferably formed with a bullet nosed configuration as at 113 to improve appearance and reduce wind resistance.

The telescope may also contain focusing means within the barrel, said focusing means being adjustable by means of a thumb nut 114 projecting at a side of the barrel. The telescope illustrated also includes a pair of spaced apart fittings 117 and 119 comprising annular collars fitting upon the outer surfaces of the barrel 109. These collars provide seats 121 adapted to fit and be received in the clamps 69 and 71. The collar 117 also provides an annular portion 123 notched on the upper side of the telescope to receive a steady pin 125 carried by the support 71 so that the telescope may be mounted in a desired angular position in the supports 71 and 69. If desired, the collar 119 may be formed to conceal the heads of reticle adjusting screws 127 in a groove 129 formed in the collar, the collar carrying an annular cover 131 adapted to removably overlie the groove and conceal the heads of the screws 127. The screws extend into the barrel of the telescope and adjustably engage a shiftable reticle therein. The collars 117 and 119 and also the focusing nut 114 may all be formed in a manner to reduce wind resistance and improve the appearance of the telescope.

The assembly may also include a spirit level 133, which may be attached preferably at its opposed ends upon spaced saddles 135. The saddles may be formed on the frame 67 although I prefer in the Y level illustrated to form the saddles 135 respectively as integral parts of the collars 117 and 119.

In order to provide for the relative angular adjustment of the telescope in a horizontal plane, I provide means for adjusting the angular position of the support 67 and spindle 59 in the frame 21, said means permitting a relatively rough rapid adjustment of the support to the approximate position required and a final accurate adjustment by means of a tangent screw. To this end, the support 67 is provided with a pair of spaced dependent ears 207 and 209, between which is mounted a projecting finger 211 formed preferably as an integral part of a clamp 213 which is carried by the frame 21. The frame 21 carries a bushing 215 secured on its upper end and the clamp has an annular portion 217 embracing said bushing. The clamp is thus rotatable on the bushing 215 and the annular portion 217 of the clamp and the bushing have co-operating parts forming a thrust bearing at 219 to support the clamp for rotation on the frame 21 at the proper elevation therein to maintain the finger 211 between the ears 207 and 209. Rotation of the clamp on the frame 21 will thus permit rotation of the support member 67 and the same may thus be roughly adjusted with the telescope pointing in an approximate desired direction. The clamp carries a clamping member comprising a screw threaded shaft 221 mounted through the annular portion 217 of the clamp, said screw having an inner end adapted to rest upon a bearing block 223 and to press the same into clamping engagement with the bushing 215 in order to lock the clamp against turning with respect to the frame 21 after the telescope has reached the approximate desired angularity with respect to the frame. The clamp 213 has an outstanding cylindrical embossment 225, through which the clamping shaft 221 projects and the projecting end of the shaft carries a cup-shaped knob 227 of preferably streamline configuration, the edges of which knob snugly embrace the sides of the embossment 225, in all adjusted positions of the clamping element 221, in order to prevent foreign matter from gaining access to the threaded shaft 221. The lower end of the element 217 overlies the surface of the frame 21 below the bushing 215 and a sealing washer 229 of preferably resilient material is applied between the parts in order to prevent foreign matter from entering the clamp through the lower end thereof.

The annular portion 217 of the clamp also embraces an annular shoulder 231 formed on the rotatable support 67 above the bushing 215, the shoulder 231 also preferably providing a seat for a resilient sealing gasket 233 which extends between the upper end of the annular clamp portion 217 and the annular shoulder 231 in order to prevent foreign matter from entering the clamp through its upper end.

In order to provide for an accurate adjustment of the relative position of the telescope after the support 67 has been clamped in roughly adjusted position as aforesaid, the support 67 carries tangent adjusting means cooperatively associated with the finger portion 211 of the clamp in order to precisely adjust the relative angular position of the support 67 with respect to the clamp. To this end, the dependent ear 207 is provided with a casing comprising a shell 235 closed at one end 237 and formed to provide a rounded or streamline configuration at said closed end. The opposite open end of the cylindrical casing is threaded into a perforation formed in the ear 207. The shell 235 encloses a pintle element 239 in its open end, which pintle element is preferably hollow and fits snugly into the open end of the shell to form an expansible housing containing spring means 241 operating to yieldingly urge the pintle element outwardly in the open end of the shell against the finger portion 211 of the clamp. The arm 209 is formed with an outwardly extending cylindrical boss 243, said boss and sleeve having an internally threaded channel to receive a threaded shaft 245, one end of which projects between the arms 207 and 209 into position engaging the finger 211 on the side thereof opposite from the pintle 239 so that the relative position of the frame 67 with respect to the arm of the clamp is determined by the arm engaging end of the threaded shaft 245. The opposite end of the shaft 245 projects outwardly of the boss 243 and carries a preferably cup-shaped knob 247 of stream line configuration, the edges of said cup-shaped knob snugly embracing the outer surfaces of the embossment 243 in order to prevent access of foreign matter to said threaded shaft. If desired, the arm 209 and embossment 243 may be slit longitudinally and a clamping member 249 applied in order to clamp the split parts together on the threaded pin 245 in order to lock the same in adjusted position.

It will be seen that the entire instrument is of dust, dirt and moisture-proof construction. All of the threaded adjusting devices are enclosed in such a way as to exclude dirt and moisture from the operating parts. The parts also are arranged to provide minimum wind resistance in the instrument while improving its appearance. These advantages are of particular value in instruments used for outdoor mensuration and the features of my present invention are especially well adapted for incorporation in surveying instruments, such as transits, levels and the like, since all of the adjusting devices are safely protected against deterioration due to the entrance of moisture, dirt and other foreign matter and the instrument will be more stable in high winds, due to the streamlined configuration of its various parts.

It is thought that the invention and numerous of its attendant advantages will be understood from the foregoing description and it is obvious that numerous changes may be made in the form, construction and arrangement of the several parts without departing from the spirit or scope of the invention or sacrificing any of its attendant advantages, the form herein described being a preferred embodiment of my invention; and I do not herein claim the several novel features of the telescope and of the spirit level, nor the manner of mounting the same in the assembly, nor the tangent clamp and the tangent adjusting mechanism, since the same form the subject-matter of copending applications for United States Letters Patent, including applications, Serial Nos. 751,241, now Patent No. 2,101,077 of December 7, 1937, and 751,242, both filed November 2, 1934, and Serial No. 757,849, filed December 17, 1934.

Having thus described my invention, what I claim as new and desire to secure by Letters Patent is as follows:

1. In a leveling device having relatively tiltable support and leveling frames wherein the leveling frame has a split portion formed with a threaded opening, a leveling screw rotatable on the support frame and having a threaded portion extending through said opening and having a projecting end extending on the side of said leveling frame opposite from the support frame, and means to tighten the split threaded portion of the leveling frame on the threaded portion of the screw, said screw having a manually operable disc thereon in position between said frames, the combination with said frames of a longitudinally expansible sleeve comprising metallic cover means enclosing said screw between the disc and said tilting frame, said cover means having sealing engagement at its opposed ends, respectively, with the tilting frame and with said disc, and means on said split frame enclosing the projecting end of said screw.

2. In a leveling device having relatively tiltable support and leveling frames wherein the leveling frame has a split portion formed with a threaded opening, a leveling screw rotatable on the support frame and having a threaded portion extending through said opening and having a projecting end extending on the side of said leveling frame opposite from the support frame, and means to tighten the split threaded portion of the leveling frame on the threaded portion of the screw, said screw having a manually operable disc thereon in position between said frames, the combination with said frames of a longitudinally expansible sleeve comprising metallic cover means enclosing said screw between the disc and said tilting frame, said cover means having sealing engagement at its opposed ends, respectively, with the tilting frame and with said disc, and means on said split frame enclosing the projecting end of said screw and comprising a metal thimble having an open end formed for reception in a socket in said split part in position to enclose the end of the screw within said thimble, the edges of said thimble at the open end thereof being slit to accommodate the clamping movement of said split screw receiving portion of the leveling frame.

ADOLPH LANGSNER.